United States Patent

Cerbone

[11] Patent Number: 4,607,534
[45] Date of Patent: Aug. 26, 1986

[54] COMPRESSION PIN LOAD TESTER

[75] Inventor: Adam C. Cerbone, Windsor, Conn.

[73] Assignee: Combustion Engineering, Inc., Windsor, Conn.

[21] Appl. No.: 737,839

[22] Filed: May 28, 1985

[51] Int. Cl.⁴ .......................... G01L 1/02; G01L 5/00
[52] U.S. Cl. ................... 73/862.01; 73/862.58; 376/245
[58] Field of Search ........... 73/862.01, 862.53, 862.54, 73/862.58, 862.61, 161, 761; 376/245

[56] References Cited

U.S. PATENT DOCUMENTS

| | | | |
|---|---|---|---|
| 2,789,430 | 4/1957 | Sinclaire | 73/161 |
| 3,004,426 | 10/1961 | Lodynski | 73/862.54 |
| 3,084,541 | 4/1963 | Rouge | 73/862.61 X |
| 3,499,324 | 3/1970 | Wenisch | 73/862.58 X |
| 3,929,010 | 12/1975 | Tjernstrom | 73/862.54 |

*Primary Examiner*—Charles A. Ruehl
*Attorney, Agent, or Firm*—Edward L. Kochey, Jr.

[57] ABSTRACT

Compression loading on pin 14 is determined by placing hydraulic jack 20 adjacent thereto. A voltage 40 is imposed between the base member 12 and the load member 10. Current flowing through the pin is detected 42. Hydraulic pressure in the jack is increased 28 until current flow through the pin stops. The pressure level at this point is determined 34.

2 Claims, 2 Drawing Figures

COMPRESSION PIN LOAD TESTER

The invention relates to compression pins and in particularly to a method and apparatus for determining the loading thereon.

It is known in nuclear reactors to suspend a cylindrical thermal shield within a cylindrical core support barrel. In addition to the support, some guidance required to avoid undo vibration or oil canning of the thermal shield. Compression pins are adjustably secured to the barrel and bear against the shield at various circumferential variations.

These pins should place some strain on the shield to preclude loss of contact between the pin and thermal shield during thermal transients or during vibration conditions. Loss of contact would cause rubbing and fretting of the surfaces and increase vibrations. At times, it is desirable to determine the loading of each pin, which may have changed from the design condition because of construction work, field repair work, or past operating conditions.

SUMMARY OF THE INVENTION

A method and apparatus for determining the load on compression pins uses the hydraulic jack. The jack is located adjacent to the pin between the base to which the pin is secured and the load member against which it is imposing the compressive force. The hydraulic pressure in the jack is increased until the pin loses contact with the load member. This point is determined by placing a voltage differential between the base and load member and detecting electric current flow through the pin. The hydraulic pressure is measured to determine the load at which the pin loses contact.

DESCRIPTION OF THE PREFERRED EMBODIMENT

Figure 1:
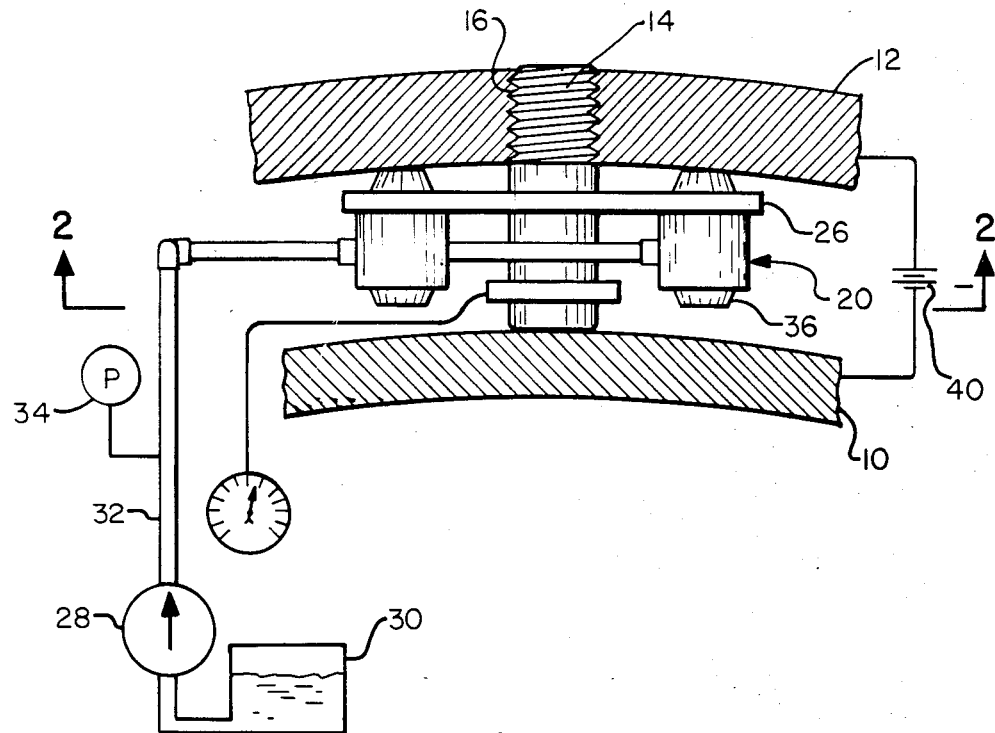
FIG. 1 is a sectional side elevation of the load tester in place.
Figure 2:
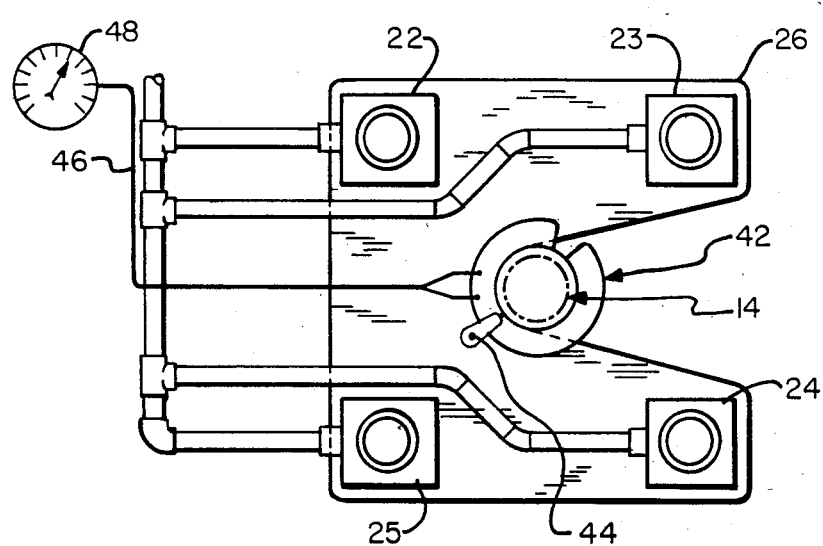
FIG. 2 is a front sectional elevation of the load tester in place.

A thermal shield 12 in the form of cylindrical member is supported coaxially within the core support barrel 10 which is considered a base member. A plurality of compression pins 14 are secured to the base member and adjusted initally by means of threads 16 to place a predetermined compressive loading on the core support barrel 10. This compressive loading is selected to maintain the material of both the thermal shield 12 and the core support barrel 10 within the elastic range during all conceivable operating conditions. It is desirable at times to check the loading on compression pin 14 to determine whether shifting of the structure has caused any deleterious variations in the loading pattern.

A hydraulic jack 20 includes four pressurizable jacking cylinders 22, 23, 24, and 25. These four cylinders are mounted on support plate 26 which is generally of a U-shape having one side open, so that it may be passed around the compression pin 14.

A hydraulic pump 28 takes hydraulic fluid from sump 30 passing it through conduit 32 to the various hydraulic cylinders. Pressure gauge 34 senses the pressure in the conduit which is substantially the same as the pressure in the hydraulic jack cylinders.

The hydraulic jack 20 is placed between the base member or thermal shield 12 and the load member or core support barrel 10 at a location surrounding to the compression pin 14. The hydraulic pump 28 is operated introducing hydraulic fluid and extending the pistons 36 until they contact the core support barrel 10.

For the purpose of determine whether pin 14 is in contact with core support barrel 10, a voltage source 40 places a voltage differential between thermal shield 12 and core support barrel 10. While current may flow between the two members through other connections, at least a portion thereof passes through the compression pin 14. A sensing coil 42 which is split and pivoted at pivot 44 is placed around the compression pin 14 for the purpose of determining when current is flowing through the pin. This coil is connected by wires 46 to meter 48 for the purpose for determining whether or not the current is passing through pin 14.

The hydraulic pressure in the jack is gradually increased exerting increasing force between core support barrel 10 and thermal shield 12. This initially decreases load on the compression pin 14 and finally moves the core support barrel 10 free therefrom. At this point, current flow through the pin 14 ceases with this point being detected by meter 48. The pressure at gage 34 is determined at this point. This pressure can be directly translated to load placed by the hydraulic jacks on the thermal shield 10 with the knowledge of the geometry of the pistons 22 through 25.

It is should be recognized that the loads so determined will be slightly different than the load initially on the compression pin 14. To the extent that only relative loading between the various pins of the reactor internals are desired this in itself is satisfactory. Should it be desirable to obtain the precise loading, such calculation can be made by ordinary engineering principles with knowledge of the diameter and thickness and loading points of the thermal shield 12 and the core support barrel 10.

I claim:

1. A method of determining the compressive loading on a compression support pin, secured to a base and compressively loading a load member, comprising;
    placing a hydraulic jack between said base and said load, in parallel and adjacent to said support pin;
    passing an electric current from said load to said base through said support pin;
    detecting flow of electric current through said support pin;
    introducing hydraulic fluid into said hydraulic jack at increasing pressure;
    sensing the pressure of fluid present within said hydraulic jack; and
    determining the pressure of the hydraulic fluid when the current flow ceases through said support pin, whereby the force required to release load from said pin may be determined.

2. An apparatus for determining the compressive loading on a compression pin secured to cylindrical base and compressively loading a concentric cylindrical member, comprising;
    a hydraulic jack positioned adjacent said pin and between said base and said member;
    means for introducing hydraulic fluid into said hydraulic jack at increasing pressure;
    means for sensing the pressure of the hydraulic fluid in said jack;
    means for connecting an electric circuit to said base and to said member whereby current flows through said pin when said pin is contacting said member; and
    means encircling said pin for detecting the flow of electric current therethrough.

* * * * *